UNITED STATES PATENT OFFICE.

CHRISTIAN JAEGER, OF NEW YORK, N. Y., ASSIGNOR TO PLASTIC ART NOVELTY AND SPECIALTY CO., OF NEW YORK, N. Y., A CORPORATION OF NEW YORK.

IMITATION FOOD OR OTHER ARTICLE AND ART OF MAKING THE SAME.

1,212,066.     Specification of Letters Patent.     Patented Jan. 9, 1917.

No Drawing.     Application filed July 8, 1916. Serial No. 108,214.

*To all whom it may concern:*

Be it known that I, CHRISTIAN JAEGER, a subject of the Emperor of Germany, and a resident of the city of New York, borough of Manhattan, in the county and State of New York, have invented a new and Improved Imitation Food or other Article and Art of Making the Same, of which the following is a full, clear, and exact description.

This invention relates to the art of reproducing and imitating natural objects such as fruits, vegetables, meats, or the like, or manufactured food products, such as pastry, confects and other articles of manufacture.

Among the objects of the invention is to provide a means or method of reproducing and imitating common objects of various types that are displayed for sale and consumption, the invention providing for the substitution of the imitation for the real objects for shop windows or other display purposes, whereby a large saving to the dealer or shop keeper may be realized, it being well known that such commodities as cigars and food products of a perishable nature are subject to considerable deterioration from exposure to the light and heat, and also require to be renewed or replaced frequently at great trouble and expense. By this improvement, I am able to reproduce practically any or every known marketable commodity of the nature above referred to, the imitations being faithful as to appearance and of a permanent nature, whereby a dealer or shop keeper may produce the desired display at a minimum cost and without the necessity for frequent renewal or change.

In carrying out the above indicated invention in a practical manner, I make use of various ingredients in proportions suitable to the particular purposes for which they are employed, the art or method being more fully set forth in detail below, with respect to several of its many applications. It will be understood, however, that the various ingredients of the components of the mass are subject to variation according to the imitations to be produced or the various conditions accompanying the operation of making them.

In the reproduction of well known articles I employ the following substances: flour, gypsum, corn starch, common salt, powdered chalk, a filling material, such as charcoal, sawdust, ground straw, paper, husks, or the like. I also employ with the above or portions of the above, a binding material comprising liquefied paraffin, to which has been added powdered sulfur, carnauba wax, beeswax, stearic acid, rosin, gum dammar or gum arabic. After thoroughly mixing the main body or filler components, the liquefied paraffin with the other binder elements, is slowly poured into the mixture, while the latter is being continually stirred, until the mass is reduced to the proper consistency for casting. Oil colors are then added to produce the ground color of the article to be reproduced. The entire mass is then boiled in double boilers and poured while hot into molds. After the articles are allowed to harden, I remove them from the molds and finish as may be necessary with artists' oil colors, or by dipping in a solution of paraffin, rosin, and beeswax, the finishing process being determined by the nature of the article being imitated.

I will now give a concise statement of the manner of treating the materials to be reproduced in order to form the molds.

When the subject to be reproduced is soft, absorbent or liable to decay, it is treated with a ten per cent. solution of formalin in alum water or with any other hardening or embalming fluid, by immersion or saturation. When thoroughly dry, a coating of shellac is applied to exclude all air. It is then left to season from three to six hours. If the subject is hard, a coating of shellac only may be sufficient. The subject prepared as above stated is then mounted or embedded in soft gypsum, cement or other molding substance and a negative mold is made by the usual methods of coating with formol and applying the plastic gypsum, cement, wax, modeling clay, or plasticine. When hardened the two parts of the mold are separated and the original subject is removed and may be destroyed. Either or both parts of the mold can then be used for casting, according as to whether complete or one-sided forms are to be produced. When necessary, a positive is made from the first molds. The details of the positive are touched up or worked out with sculptors' tools and then form or sectional molds, or duplicates of the same, may be made by the usual methods.

For the reproducing of fruit and similar articles, I prefer to employ the following commodities or ingredients in substantially the proportions indicated: Flour, five pounds; gypsum, one pound; powdered chalk, one-half pound; common salt, one-half pound; sawdust or other filler, three pounds. In connection with the above, I employ a binder of paraffin sufficient to form a soft jelly, in which is dissolved one-quarter pound of powdered sulfur, one-quarter pound carnauba wax, one-quarter pound beeswax, one ounce rosin, two tablespoonfuls gum arabic and for a fine texture I may add one-half pound stearic acid. Oil colors are added according to the desired color of the article to be reproduced. For pastry, meats, and articles of coarse textures, I replace part of the flour with corn starch and increase the amount of filler. For candies and confects, I use less flour and more gypsum.

In the making of imitation cigars to be displayed in boxes in tobacconists' windows or showcases, I employ the following formula: flour, two pounds; gypsum, five pounds, sawdust or other filler, three pounds, and a liquid paraffin binder in which is dissolved one pound sulfur, one pound carnauba wax and two tablespoonfuls gum dammar mixed to a thin liquid.

For making imitation ice cream, I employ flour, two pounds; corn starch, six pounds; table salt, two pounds, all mixed thoroughly with liquid paraffin in which a little rosin has been dissolved to the consistency of a soft dough. The mass is then formed in bricks or cast in suitable molds such as sherbet dishes.

I claim:

1. The herein described art of producing imitations of common objects, comprising (1) the mixing thoroughly together of a mass of flour, gypsum, and a bulky filler; (2) the dissolving in liquid paraffin of sulfur and gum and a resinous material to constitute a binder; (3) the mixing and boiling together of the first mentioned mass and the binder, (4) the molding of the mixture in suitable molds, and the addition of suitable coloring matter.

2. The herein described composition of matter for making imitation food or other products, comprising a bulky mass of flour, gypsum, and sawdust, a binder comprising a solution of sulfur, carnauba wax, beeswax, and a resinous material in paraffin, and suitable coloring matter.

CHRISTIAN JAEGER.